United States Patent [19]

Butera

[11] Patent Number: 4,761,911

[45] Date of Patent: Aug. 9, 1988

[54] SELF-ACTUATING ANIMAL SNARE

[76] Inventor: Richard E. Butera, 2935 Lynn Dr., Willoughby Hills, Ohio 44092

[21] Appl. No.: 80,788

[22] Filed: Aug. 3, 1987

[51] Int. Cl.⁴ .............................................. A01M 23/34
[52] U.S. Cl. ......................................................... 43/87
[58] Field of Search ....................................... 43/86, 87

[56] References Cited

U.S. PATENT DOCUMENTS

| | | | |
|---|---|---|---|
| 1,600,756 | 9/1926 | Fairbanks | 43/87 |
| 1,615,586 | 1/1927 | Kleffman | 43/87 |
| 1,732,919 | 10/1929 | Thompson | 43/87 |
| 1,738,907 | 12/1929 | Kleffman | 43/87 |
| 1,776,782 | 9/1930 | Carr et al. | 43/87 |
| 1,841,872 | 1/1932 | Bjornseth | 43/87 |
| 1,913,893 | 6/1933 | Morrill | 43/87 |
| 1,933,855 | 11/1933 | Johnson | 43/87 |
| 2,537,894 | 1/1951 | Haviland | 43/87 |
| 2,683,952 | 7/1954 | Armstrong | 43/87 |
| 4,083,142 | 4/1978 | Gregerson | 43/87 |
| 4,578,894 | 4/1986 | Butera | 43/87 |

Primary Examiner—Gene P. Crosby
Attorney, Agent, or Firm—Renner, Otto, Boisselle & Sklar

[57] ABSTRACT

An animal snare includes a built-in force urging the snare loop toward a constricted, relatively small triggered position from a larger setting position. When the snare is released from the triggered position by an animal, the built-in force accelerates constriction of the loop, preventing animal escapes that might otherwise occur. The snare includes a flexible cable having opposed anchor and loop ends, with the loop end slidably engaged by a catch to an intermediate portion of the cable to form the constrictable ensnaring loop and for releasably, frictionally restraining the loop end relative to the intermediate portion when the snare is in its setting position. The built-in force is introduced during manufacture of the snare by giving a permanent set to the portion of the snare cable proximate its loop end. The catch may be a U-shaped clip having two opposed legs, one leg having a hole through which the cable passes and the other leg having an elongated slot through which the cable passes and which is aligned with the hole.

18 Claims, 1 Drawing Sheet

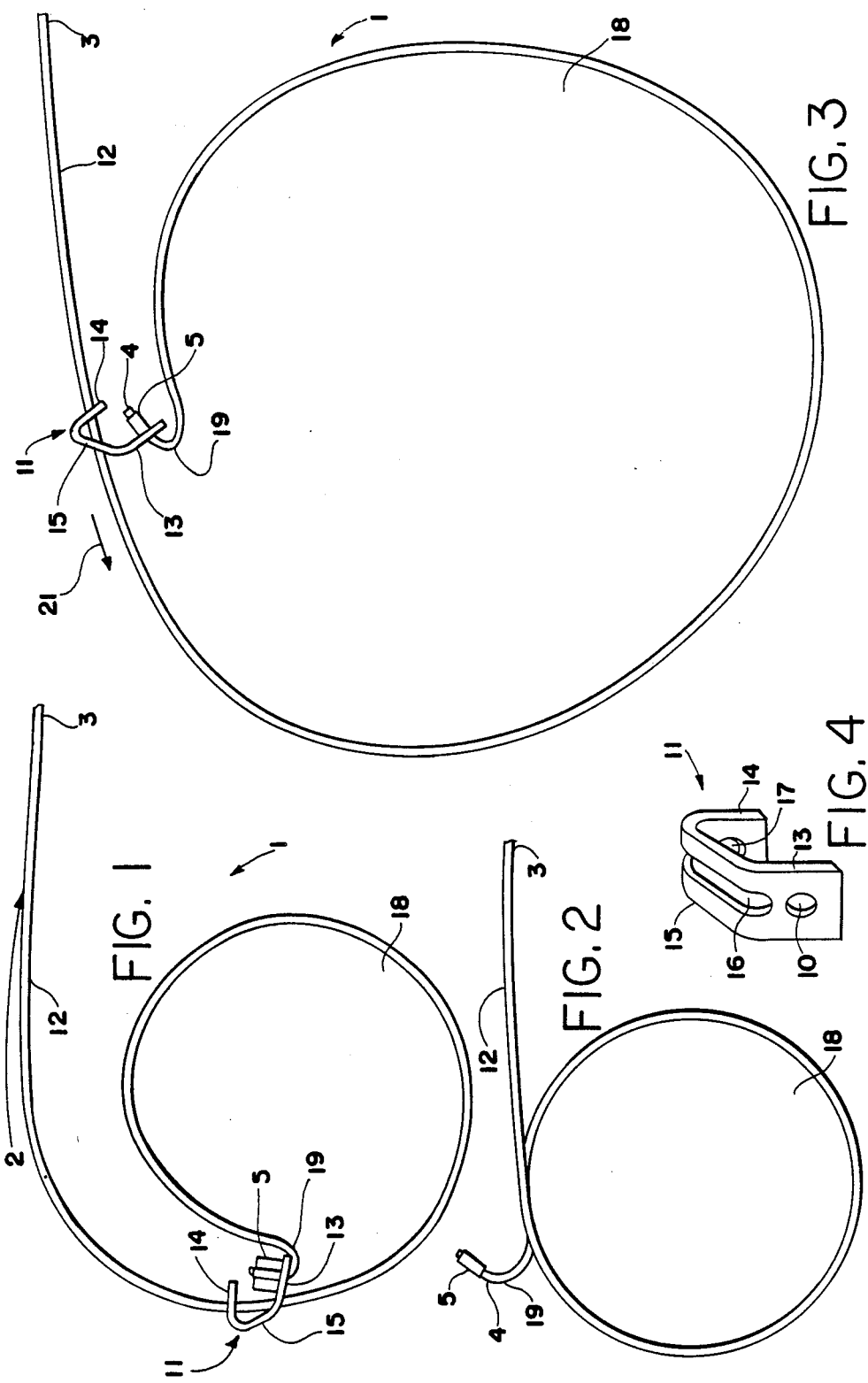

SELF-ACTUATING ANIMAL SNARE

This invention concerns animal snares and particularly a self-actuating animal snare in which the snare loop, upon triggering, constricts rapidly under the influence of a force applied by the snare loop itself.

BACKGROUND

Snares have long been used to capture small animals such as rabbits and larger animals such as foxes, coyotes and wolves. Typically, as snare includes a length of a flexible cable such as wire or rope that is threaded through a slide or slip member to which one end of the cable is joined or connected to form a loop or noose. The snare loop is adjusted in size so that the animal being sought can insert its head in the loop.

The snare loop is suspended at an appropriate height, considering the animal being snared, at a location or along a path frequented by the animal. When the animal inserts its head into the loop and subsequently tugs, the loop is tightened around the animal's neck. Once the loop has tightened, the animal generally cannot free itself from the loop.

Some, particularly wily animals can sense the presence of a snare loop as their head is being inserted into it. These animals might withdraw from the loop and escape without causing any constriction of the loop or sufficient constriction to ensnare the animal. This possibility of escape is provided because constriction of the loop is driven (actuated) entirely or nearly entirely by forces applied to it by the animal. If additional triggering forces could be applied to close the snare rapidly, animal escapes could be prevented.

Accordingly, it would be desirable to provide a snare including an actuating force that rapidly urges constriction of the loop upon triggering disturbance of the snare by an animal. Moreover, it would be desirable to provide such a snare which is inexpensive and easy to manufacture.

SUMMARY OF THE INVENTION

In a snare according to the invention, a built-in spring force urges the snare loop toward a constricted, relatively small closed (triggered) position from a larger opened setting position. When the snare is released from the setting position by an animal, the built-in spring force accelerates constriction of the loop, compared to the rate at which the loop would otherwise close solely in response to tugging forces applied by an animal. Moreover, once the snare is triggered, the built-in spring force will cause the loop to close even if the animal were to cease tugging. This rapid and independent constriction of the loop prevents animal escapes that might otherwise occur.

A snare according to the invention includes a flexible cable having opposed anchor and loop ends, with the loop end being slidably engaged to an intermediate portion of the cable to form the constrictable ensnaring loop. The loop can be formed into a relatively large area when set so that an animal can insert its head entirely through the loop. When triggered and closed, the loop can have a smaller area, intended to be no larger than about the average neck size of the animal to be snared so that the animal cannot escape. A catch is provided at the loop end of the cable for slidably connecting the loop end to the intermediate portion of the cable and for releasably restraining the loop end relative to the intermediate portion when the snare is in its setting position. The spring force urging the snare towards its triggered position is built in to the snare during its manufacture and does not require an additional element. During manufacture of the snare, the portion of the snare cable proximate its loop end is given a permanent set so that the snare cable is formed into a loop of the triggered or closed position size when the cable is relaxed.

Preferably, the catch frictionally engages the intermediate portion of the cable to restrain the loop in the setting position. The catch may be a U-shaped clip having two opposed legs, one leg having a hole through which the cable passes and the other leg having an elongated slot through which the cable passes and which is aligned with the hole. The legs are joined by a bridging portion of the clip that forms an obtuse angle with one of the legs and an acute angle with the other of the legs. The loop end of the cable has crimped on it a ferrule that prevents withdrawal of the loop end from a second hole in the clip, through which the cable passes.

BRIEF DESCRIPTION OF THE DRAWINGS

In the annexed drawings:

FIG. 1 is a view of an animal snare according to the invention in its closed (triggered) position;

FIG. 2 is a view of a cable having a permanent set for use in a snare according to the invention;

FIG. 3 is a view of a snare according to the invention in its setting position; and FIG. 4 is a perspective view of a clip used in an embodiment of the invention.

DETAILED DESCRIPTION

A snare 1 according to the invention includes a length of flexible cable 2, such as a multiple wire steel cable or rope having opposed ends. A preferred cable is 3/32" 7×7 galvanized aircraft cable or the equivalent. One of the ends 3 is designated as the anchor end. In normal use, the anchor end includes a fitting, such as a swivel or other known anchoring device (not shown), for anchoring the snare to a fixed external object. Anchoring is necessary so that an animal trapped in the snare cannot remove the snare and escape with it.

Opposite end 4 of cable 2 is designated as the loop end. A sleeve or ferrule 5 is crimped or swaged onto loop end 4 of cable 2. In an assembled snare, loop end 4 is inserted through a hole 10 of a clip 11, best seen in FIG. 4, that slidingly engages loop end 4 with an intermediate portion 12 of cable 2. Ferrule 5 prevents the withdrawal of cable 2 from clip 11 when cable 2 is placed in tension by a force applied at intermediate portion 12.

As seen in FIGS. 1, 3 and 4, clip 11 includes two, sustantially parallel, generally opposed legs 13 and 14. Legs 13 and 14 are joined by a bridging portion 15 of the clip so that an obtuse angle is formed between leg 13 and bridging portion 15, while an acute angle is formed between leg 14 and bridging portion 15. Leg 13 also includes an elongated slot 16 extending into bridging portion 15. Leg 14 includes a hole 17 generally aligned with slot 16.

In the assembled snare of FIGS. 1 and 3, it can be seen that intermediate portion 12 of cable 2 passes through hole 17 and slot 16. In order that a generally circular loop 18 may be formed by cable 2 between loop end 4 and clip 11 when the clip is engaged to the cable and for preferred action of the snare, cable 12 contains a bend 19 of about 135° proximate its loop end where it emerges from hole 10 of clip 11. As explained below, bend 19 cooperates with clip 11 for restraining loop 18 in its setting position.

In FIG. 1, loop 18 is shown in its closed or triggered position. The area within loop 18 is chosen to be approximately the same as or less than the neck size of an animal desired to be trapped with the snare. This area is approximately that enclosed by loop 18 when the natural forces in cable 2 are allowed to position the cable. As is apparent from FIG. 2, cable 12 proximate its loop end 4 has been given a permanent set so that loop 18 is naturally formed under the influence of this set. In FIG. 2, clip 11 is missing so that it does not apply any forces that might distort loop 18. The size of cable 12 depends upon the size of the animal intended to be ensnared. An appropriate cable is so-called 7×7 galvanized steel cable, i.e., seven bundles of seven strands per bundle, that is about 3/32" in diameter. A permanent set can be imparted in such cable by passing it through a conventional ring roller. The dimensions and relative arrangement and gearing of the rolls of the ring roller determine the size of loop 18 imparted by the set. Once the loop is formed, clip 11 can be threaded on the cable to establish the desired sliding interconnection between loop end 4 and intermediate portion 12 of cable 2. The result is the snare shown in FIG. 1.

In order to entrap an animal with snare 1, loop 18 must be enlarged to permit the animal to insert its head within the snare. A resulting setting position of the snare is illustrated in FIG. 3. There, clip 11 has been advanced toward the anchor end 3 along intermediate portion 12 of cable 2 to open loop 18. Cable 2 passes through hole 17 in clip 11 which frictionally engages the cable. By virtue of bend 19 in loop end of cable 2 and expanded loop size, clip 11 is cocked into binding engagement with intermediate cable portion 12. This results in the frictional engagement of the cable with clip 11 at the perimeter of its hole 17. Slot 16 acts as a guide, limiting the direction of the frictional engagement. The permanent set in cable 2 produces a spring force indicated by arrow 21 in FIG. 3 that urges clip 11 to slide along the cable generally in the direction of loop end 4. This urging force is resisted by the frictional engagement of clip 11 and intermediate portion 12 of the cable at the setting position of the cable.

The snare will have a minimum setting position forming a loop 18 larger than the closed or relaxed position of the loop. At this minimum or larger loop setting position, the clip will engage the cable with sufficient static frictional holding force to hold the clip in place against the spring force generated by the permanent set. At a position less than the minimum setting position but greater than the closed loop position, the binding action of the clip on the cable and resultant static frictional forces will not be sufficient to prevent the clip from being moved along the cable by the spring force whereupon the loop will be actuated to its closed or constricted position. Accordingly, the loop will always be actuated by the permanent set to its closed relaxed position whenever at a size less than the minimum setting position. It should be understood that the minimum setting position may vary with how the snare is suspended, i.e., how the anchor end of the cable is suspended. The minimum setting, for example, would normally be greater when the anchor end is supported more vertically upright than horizontally. Preferably, one snare is set at a position slightly and sufficiently greater than the minimum setting to prevent false triggering of the snare, such as the snare blowing in the wind, although is has been found that the snare is less sensitive to outside bumping forces than inside tugging forces, as is desirable.

In operation when the static frictional engagement of clip 11 and cable 2 is disturbed by an animal tugging on loop 18, clip 11 is released from engagement with cable 2. Clip 11 immediately begins sliding along cable 2 in direction 21 under the influence of the force exerted by the permanent set. That is, the snare is triggered and constrictable loop 18 immediately becomes smaller in size. Ultimately, loop 18 reaches the size shown in FIG. 1, without any tugging on cable 2 by the ensnared animal. Since this triggering motion occurs very rapidly, even a very clever animal sensing the presence of the loop, has insufficient time to withdraw its hand from the loop before being ensnared.

Snares according to the invention must be sized according to the animal being trapped. That is, the area of loop 18 in its triggered position must not be so large that the ensnared animal can escape. Some known snares may be used with a number of different size animals. However, the reduction in escapes with the novel snare justifies the slight inconvenience of using sized snares.

The invention has been described with respect to certain preferred embodiments. Various modifications within the spirit of the invention will occur too those of skill in the art. Accordingly, the scope of the invention is limited solely by the following claims.

I claim:

1. A snare for trapping animals comprising a flexible cable having opposed anchor and loop ends, said loop end operatively connected to an intermediate portion of said cable to form a constrictable loop for ensnaring an animal, said loop having a relatively large area setting position and a relatively smaller area closed position, actuating means for urging said loop toward said closed position and catch means for releasably restraining said loop in said setting position, and said actuating means comprising a length of cable proximate said loop end having a permanent set approximately in the shape of said closed position.

2. The snare of claim 1 wherein said catch means comprises means for slidably engaging said cable and for releasably, frictionally engaging said intermediate portion of said cable.

3. The snare of claim 2 wherein said catch means comprises a generally U-shaped clip having two opposed legs, the first of said legs including a hole through which said cable passes, and the second of said legs including an elongated slot through which said cable passes.

4. The snare of claim 4 wherein said second leg includes a hole through which the loop end of said cable passes, said loop end including a ferrule for prevention of withdrawal of said loop end from said clip through said second hole and including a bend proximate said loop end cooperating with said clip for releasable frictional engagement of said first leg with said cable.

5. The snare of claim 4 wherein said first and second legs are joined by a bridging portion of said clip, said bridging portion forming an obtuse angle with one of said legs and an acute angle with the other of said legs.

6. A snare for trapping animals comprising a flexible cable having opposed anchor and loop ends, catch means for operatively connecting said loop end to an intermediate portion of said cable to form a constrictable loop and for advancing said loop end along said intermediate portion to constrict said loop for ensnaring an animal and self-actuating means for causing constriction of said loop independently of an animal tugging on said loop.

7. The snare of claim 6 wherein said self-actuating means comprises a length of said cable proximate said loop end having a permanent set generally in the form of a constricted loop.

8. The snare of claim 6 wherein said catch means comprises releasable engaging means for releasably, frictionally engaging said catch means with said intermediate portion of said cable.

9. The snare of claim 8 wherein said catch means comprises a generally U-shaped clip having two opposed legs, the first of said legs including a hole through which said cable passes, the second of said legs including an elongated slot generally aligned with said hole, said cable passing through said slot and cooperating with said hole for releasably, frictionally engaging said catch means with said cable.

10. The snare of claim 9 wherein said legs are joined by a bridging portion of said clip, said bridging portion forming an obtuse angle with one of said legs and an acute angle with the other of said legs.

11. The snare of claim 9 wherein one of said legs includes a second hole through which said cable proximate said loop end passes, said loop end including a ferrule for prevention of withdrawal of said loop end from said clip through said second hole.

12. The snare of claim 11 wherein said cable includes a bend proximate said loop end for cooperating with said catch means for releasably frictionally engaging said catch means with said intermediate portion of said cable.

13. A snare for trapping animals comprising a flexible cable having opposed anchor and loop ends, said loop end being operatively connected to an intermediate portion of said cable to form a constrictable loop for ensnaring an animal, and a triggering means for actuating constriction of said loop, said triggering means including a length of cable proximate said loop end having a permanent set generally in the form of a constricted loop.

14. The snare of claim 13 wherein said triggering means includes catch means engaged to said loop end and slidably engaging said cable for releasably, frictionally engaging said cable along said intermediate portion.

15. The snare of claim 14 wherein said catch means comprises a generally U-shaped clip having two opposed legs, the first of said legs including a hole through which said cable passes, the second of said legs including an elongated slot generally aligned with said hole, said cable passing through said slot and cooperating with said hole for releasably, frictionally engaging said catch means with said cable.

16. The snare of claim 15 wherein said legs are joined by a bridging portion of said clip, said bridging portion forming an obtuse angle with one of said legs and an acute angle with the other of said legs.

17. The snare of claim 15 wherein one of said legs includes a second hole through which said cable proximate said loop end passes, said loop end including a ferrule for prevention of withdrawal of said loop end from said clip through said second hole.

18. The snare of claim 17 wherein said cable includes a bend proximate said loop end for cooperating with said catch means for releasably frictionally engaging said catch means with said intermediate portion of said cable.

* * * * *